P. W. REID.
Molds for Manufacturing Bottles.

No. 169,038. Patented Oct. 19, 1875.

WITNESSES
Henry N. Miller
C. L. Everh

INVENTOR
Peter W. Reid
By Alexander Mason
Attorney

UNITED STATES PATENT OFFICE.

PETER W. REID, OF PITTSBURG, PENNSYLVANIA, ASSIGNOR TO McKEE & BROTHERS, OF SAME PLACE.

IMPROVEMENT IN MOLDS FOR MANUFACTURING BOTTLES.

Specification forming part of Letters Patent No. 169,038, dated October 19, 1875; application filed October 4, 1875.

*To all whom it may concern:*

Be it known that I, PETER W. REID, of Pittsburg, in the county of Allegheny and in the State of Pennsylvania, have invented certain new and useful Improvements in Molds for Manufacturing Bottles; and do hereby declare that the following is a full, clear, and exact description thereof, reference being had to the accompanying drawings, and to the letters of reference marked thereon, making a part of this specification.

The nature of my invention consists in the construction and arrangement of a mold for manufacturing bottles connected together, as will be hereinafter more fully set forth.

In order to enable others skilled in the art to which my invention appertains to make and use the same, I will now proceed to describe its construction and operation, referring to the annexed drawings, in which—

Figure 1:
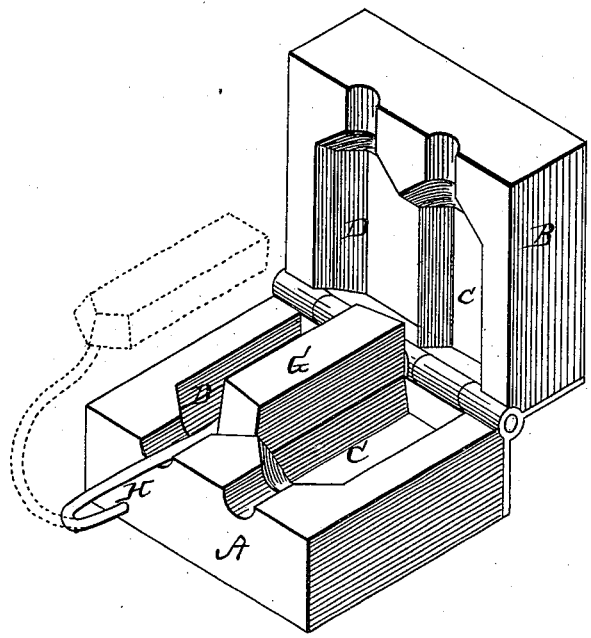
Figure 2:
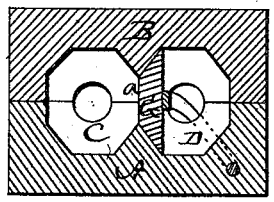

Figure 1 is a perspective view of the mold open. Fig. 2 is a cross-section of the same when closed.

The flask is made in two parts, A and B, hinged together, and having the molds C D formed therein, one-half of each mold being in each half of the flask. The two molds have a longitudinal opening between them at $a$, in which is placed a partition, G, attached to a wire handle, H, pivoted in the bottom part A of the flask.

The method of working this mold is to have the partition G swing into place adjoining the mold C, and the glass inserted in said mold. The flask is then closed, and the bottle blown in the mold C; the flask then reopened, the partition G swung outside of the flask, and glass inserted in the mold D. The flask is then closed again, and the bottle blown in the mold D, which produces two bottles blown together, they being connected through the aperture.

Having thus fully described my invention, what I claim as new, and desire to secure by Letters Patent, is—

The flask A B, formed with the two molds C D, having an aperture, $a$, between them, and a swinging partition, G, to close or open said aperture, substantially as and for the purposes herein set forth.

In testimony that I claim the foregoing I have hereunto set my hand this 13th day of September, 1875.

P. W. REID.

Witnesses:
 WM. A. SKINKLE,
 DANIEL BERG.